United States Patent Office 2,711,989
Patented June 28, 1955

2,711,989

METHOD OF PREPARING RADIOACTIVE GLUTATHIONE

Louis Laufer and Sidney Gutcho, New York, N. Y., assignors, by mesne assignments, to the United States of America as represented by the Secretary of the Navy No Drawing. Application April 13, 1954,
Serial No. 423,006

4 Claims. (Cl. 195—37)

This invention relates to improvements in methods of preparing radioactive sulfur compounds, and more particularly pertains to improvements in methods of preparing radioactive sulfur labeled glutathione.

Glutathione, a sulfur containing tripeptide, has specific prophylactic action against radiation damage and additional properties that are effective in the treatment of shock. It is of practical use in reducing the requirement for plasma and whole blood in injury involving shock and in substantially improving survival rate. In addition, it assists in providing effective protection to personnel exposed to extended radiation.

Further uses of glutathione relate to the study of such basic physiological problems as the factors controlling electrolyte equilibrium and cell membrane permeability, the dynamics of adrenal cortical response, and the protection of key biochemical systems involving enzymes containing sulfhydryl groups.

Glutathione labeled with radioactive sulfur is thus useful in histological tracer studies of the fate of glutathione sulfhydryl in various organisms following intravenous administration.

Methods described previously for the isolation of $S^{35}$ labeled glutathione from yeast cells grown in $S^{35}$ sulfate containing media have involved the growth of large quantities of yeasts in large volumes of media. The methods further required manipulations on a large scale to isolate generally impure products of low radioactivity.

The method herein described provides a practical biosynthesis of pure $S^{35}$ glutathione in significant quantity and, if desired, at high levels of specific activity. Generally, the technique comprises the propagation of yeast on a semi-micro scale in a high level $S^{35}$ sulfate medium and the subsequent addition of unlabeled glutathione as a carrier for the highly radioactive $S^{35}$ glutathione synthesized.

The synthetic medium utilized in preparing radioactive sulfur labeled glutathione is the standard basal medium, without the trace metals, described by B. H. Olson and M. J. Johnson in J. Bact. 57, 235 (1949). Inoculum was prepared by introducing a loop of cell suspension taken from an agar slant into 10 ml. of this medium and shaking at 30° C. for 24 or 48 hours, depending on the rate of growth estimated by observing turbidity.

This inoculum was transferred to 100 ml. of the medium contained in a 250 ml. gas washing bottle fitted with a fritted glass gas dispenser (of coarse porosity). The medium was aerated for 24 hours at 30° C. at an aeration rate of 24 ml./min., such rate being adapted to keep the yeast cells in suspension. Glutathione was isolated from the washed, harvested cells by plasmolyzing the yeast with Pirie's solution (ethanol, 3 ml., water, .17 ml., conc. $H_2SO_4$, .31 ml.) having a volume equal to one-fifth of the packed yeast cell volume, then washing with equal volumes of 1% $H_2SO_4$ and precipitating the glutathione from the plasmolyzate as a cuprous salt by using a cuprous sulfite salt, obtained by heating a solution of $CuSO_4.5H_2O$ with an excess of $NaHSO_3$ and separating and washing the red precipitate thus formed, to precipitate the copper.

The cuprous salt was decomposed with $H_2S$, the $Cu_2S$ removed by filtration and washed, and glutathione crystallized from the combined filtrate and wash by concentration followed by the addition of ethanol. Part of the carrier glutathione was added prior to precipitation of the cuprous glutathione, the remainder being added prior to the crystallization of the final product. Thus the following sequence of operations was followed:

1. Yeast cells grown 24 hours on synthetic medium containing $S^{35}$ sulfate. 100 ml. medium, aeration 24 ml./min., temp. 30° C. Inoculum about 0.2 packed cells.
2. Harvest cells and wash by centrifugation. (2.5–3.0 ml. packed volume.)
3. Plasmolyze packed cells by adding 0.2 vol. Pirie's solution (ethanol, 3 ml., water, .17 ml., conc. $H_2SO_4$, .31 ml.)
4. Collect supernatant and 3 washes of 3–5 ml. each by centrifugation.
5. Add carrier glutathione.
6. Precipitate cuprous glutathione by addition of cuprous sulfite reagent at pH 1.5.
7. Recover cuprous glutathione by centrifugation and wash.
8. Suspend washed cuprous glutathione in water and gas with $H_2S$ to decompose and precipitate $Cu_2S$.
9. Remove and wash $Cu_2S$ by filtration. Combine supernatant and wash.
10. Add additional carrier glutathione calculated for desired specific activity of final product. Strip $H_2S$ with nitrogen stream.
11. Treat with carbon.
12. Concentrate in vacuo and crystallize from water or water-ethanol.

At all steps in the process, the pathway of the $S^{35}$ utilization was followed by preparing infinitely thin films of all separated fractions on aluminum planchets having an area of 7.1 cm.$^2$. Triplicate planchets for two different micro-aliquots (usually 25, 50 or 100 μl.) were made. To effect the distribution of the radioactive sample, 100 μl. of a 0.1% solution of detergent and sufficient water or water and alcohol to cover the planchet were added. The solutions (or, in the case of yeast cells and yeast solids, the suspensions) were dried under a reflector drying lamp, and the counts determined by means of a windowless flow counter. Each planchet was counted for four minutes, and the average value for the two levels taken and corrected by a background count.

Infinitely thin films, requiring a deposition of less than .1 mg. of solids/sq. cm., were indicated when proportional counts were obtained for the two different aliquots taken. When self-absorption occurred, smaller aliquots were taken or higher dilutions made. When high and even intermediate level $S^{35}$ experiments were run, self-absorption offered no problem because such high dilutions were required to bring the counts within limits giving minimum coincident loss correction (less than 5000 c. p. m.). Glutathione content of yeast plasmolyzates were determined by spectrophotometric measurement of the complex formed by glutathione and alloxan at pH 7.4, which measured reduced glutathione and was not affected by the presence of other sulfhydryls or disulfide compounds.

Varying nutrient conditions and yeast strains does not affect the yield materially. In experiments both with and without $S^{35}$ addition, the amount of the inoculum was not standardized. The amount of yeast harvested, however, was not as varied. The glutathione content of the yeasts employed are shown in Table I hereinbelow, and the incorporation of $S^{35}$ into glutathione by yeasts are tabulated in Table II hereinbelow:

TABLE I

*Relative capacity of selected yeast strains to synthesize gluthathione*

| Yeast | Volume of Washed Packed Yeast Cells | Glutathione by Spectrophotometric Measurement by "305" | Glutathione/ milliliter of Centrifugal Cells | Average |
|---|---|---|---|---|
| | Ml. | Mg. | Mg. | |
| Brewers S 36 | 0.55 | 0.510 | 0.93 | |
| Brewers S 101 | 0.50 | 0.507 | 1.01 | |
| Brewers S 203 | 0.65 | 0.560 | 0.86 | 0.98 mg.; S.D.=0.11. |
| Brewers S 203 | 0.70 | 0.780 | 1.11 | |
| Baker's (Atlantic) | 0.85 | 0.580 | 0.68 | |
| Baker's | 0.90 | 1.88 | 2.09 | |
| Baker's a | 0.85 | 1.02 | 1.20 | |
| Baker's b | 1.05 | 1.31 | 1.25 | 1.19 mgs.; S.D.=0.43. |
| Baker's c | 0.85 | *0.934 | 1.10 | |
| Baker's d | 1.00 | *0.715 | 0.72 | |
| Baker's e | 1.20 | *1.59 | 1.32 | |
| Torula (ATCC 9248) | 1.75 | 1.13 | 0.65 | |
| Torula | 1.75 | 2.38 | 1.36 | |
| Torula | 1.90 | 2.42 | 1.27 | |
| Torula f | 2.30 | 2.12 | 0.92 | 1.00 mg.; S.D.=0.26. |
| Torula g | 3.0 | *2.32 | 0.77 | |
| Torula h | 2.35 | *2.66 | 1.13 | |
| Torula i | 3.0 | *2.80 | 0.93 | |

*These values are corrected for small additional amounts of glutathione found in plasmolyzed yeast residues by $S^{35}$ count.

TABLE II

*Incorporation of $S^{35}$ into gluthathione of yeast*

| Yeast | Medium [1] Glucose, g. | Medium [1] Sulfate, mg. | $S^{35}$ Added, μc. | Percent $S^{35}$ Left in Medium | Percent $S^{35}$ in Cells | Percent Cellular Extract | Percent $S^{35}$ in Residue | Percent Initial $S^{35}$ in Extract | Glutathione, Percent Totals Spectrophotometric |
|---|---|---|---|---|---|---|---|---|---|
| Brewer's S 36 | 1.0 | 25 | 4.20 | 85.1 | 18.5 (103.6) | 27.5 | 79.9 (107.4) | 5.10 | |
| Baker's a | 1.0 | 12.5 | 3.64 | 61.3 | 37.1 (98.4) | 21.6 | 79.4 (101.0) | 8.02 | 6.50 |
| Baker's b | 1.0 | 25 | 4.27 | 77.2 | 22.8 (100) | 21.2 | 76.0 (97.2) | 4.83 | 4.18 |
| Baker's c | 2.0 | 25 | 2.94 | 81.5 | 23.2 (104.7) | 22.8 | 87.5 (110.3) | 5.30 | 2.98 |
| Baker's d | 5.0 | 25 | 2.85 | 72.2 | 28.2 (100.4) | 13.4 | 89.0 (102.4) | 3.78 | 2.29 |
| Baker's e | [2] 1.0 | [2] 25 | 2.86 | 74.0 | 29.7 (103.7) | 23.3 | 70.9 (94.2) | 6.97 | 5.10 |
| Torula g | [2] 1.0 | [2] 25 | 2.89 | 51.5 | 51.2 (102.7) | 18.3 | 78.0 (96.3) | 9.37 | 7.46 |
| Torula h | 1.0 | 25 | [3] 158 | 66.2 | 33.2 (99.4) | 32.5 | 72.1 (104.5) | 10.8 | 8.50 |

[1] Basic Medium of Olson & Johnson, J. Bact. 57, 235 (1949) was used in all cases, but prescribed trace metals were added only where indicated. Sulfate is given as weight of $MgSO_4 \cdot 7H_2O$ added.
[2] Trace metals.
[3] Intermediate level.

From the foregoing experience in low level fermentation, four fermentation runs using the Torula yeast in the Olson and Johnson medium without trace mineral addition were made. The first run, W, was at an intermediate level using 158 μc. of $S^{35}$ in the medium. Runs X, Y and Z embodied minor modifications for full-scale preparations of glutathione adding 14.6 mc., 62.5 mc. and 48 mc. respectively. The abbreviation mc. is for millicuries. The four runs gave the following results:

TABLE III

*$S^{35}$ and glutathione balances on 4 preparative runs distribution of initial radioactivity (percent)*

(All figures below are percent)

| Run Designation ($S^{35}$ Used) | W | 0.158 mc. | X | 14.6 mc. | Y | 62.5 mc. | Z | 48 mc. |
|---|---|---|---|---|---|---|---|---|
| In medium after fermentation | 66.2 | | 53.1 | | 55.9 | | 23.9 | |
| In washed yeast crop | 33.2 | | 42.7 | | 38.1 | | 76.9 | |
| | | *(99.4) | | (95.8) | | (94.0) | | (100.8) |
| In yeast residue after extraction | 23.9 | | 32.7 | | 33.9 | | 57.9 | |
| In plasmolyzate | 10.8 | | 11.7 | | 10.2 | | 20.5 | |
| | | 34.7 | | 44.4 | | 44.1 | | 78.4 |
| | | (104.5) | | (104) | | (116) | | (102) |
| Not precipitated by copper reagent | 3.9 | | 5.0 | | 4.7 | | 11.5 | |
| In filtrate from $Cu_2S$ | 5.5 | | 7.2 | | 6.5 | | 12.9 | |
| | | 9.4 | | 12.2 | | 11.2 | | 24.4 |
| | | (87) | | (104) | | (110) | | (119) |
| Recovered as glutathione | 4.5 | (82) | 6.15 | (86) | | | 9.2 | |
| Recovered as oxidized glutathione | | | | | 4.3 .3 1.0 | | | |
| Otherwise accounted for | | | | | .8 | | 6.4 (98) 1.7 | 12.9 (100.5) |

*Figures in ( ) indicate calculated material balance efficiency for the step in that row only.

FERMENTATION W

In this run, the combined Pirie solution plasmolyzate from the 2.3 ml. of packed cells and washes from the yeast residue was added to 2.5 grams of cold glutathione dissolved in 100 ml. of water and brought to pH 1.0 with sulfuric acid. To this was added, in portions, copper sulfite reagent prepared from 2.5 grams of $CuSO_4 \cdot 5H_2O$ with an excess of $NaHSO_3$ and separating and washing the red precipitate thus formed. This represented about 20% stoichiometric excess. After the final portion was added, the pH was adjusted to 1.5 and the suspension of cuprous glutathione refrigerated at 4° C. for three days. The precipitate was then centrifuged and washed three times with about 5 ml. of distilled water to remove excess sulfate. A small additional precipitate that formed in the supernatant and washes was discarded. The radioactivity in the washes was 2.8% of the total activity in the plasmolyzate.

The washed cuprous glutathione precipitate was suspended in about 5 ml. of water and decomposed by bubbling hydrogen sulfide gas through a capillary for about one hour. The resulting $Cu_2S$ slurry was filtered with the aid of filtercel and the clear filtrate stripped of excess hydrogen sulfide with nitrogen. An additional 7.5 grams of cold glutathione was then dissolved in 25 ml. of warm water and added to the 46 ml. of filtrate. The combined solutions were evaporated to dryness in vacuo over calcium chloride and then crystallized twice from water-alcohol solutions.

The final product, weighing 7.0 grams, had a melting point of 189–191° C. The specific activity was 610 c. p. m./mg.

FERMENTATION X

In this run of 14.6 mc. in the medium, the general technique and sequence of steps of fermentation W was followed, with modifications. The Pirie plasmolyzate and washes from the 3.0 ml. of washed packed cells obtained was added to 75 ml. of water containing 2.5 grams of cold glutathione and the combined solution adjusted to pH 1.5 with sulfuric acid and warmed to 40–50° C. The same quantity of copper reagent was added in portions with manual stirring at this temperature. Immediately after precipitation of the cuprous glutathione, the floc was centrifuged off in two 50 ml. tubes, washed once with about 10 ml. of water, and refrigerated. Additional precipitates appeared in both the mother liquor and the wash, and they were recovered and combined with the initial crop of cuprous glutathione. The combined precipitates were washed three times with 5 ml. portions of water to remove excess sulfate.

The additional carrier, 7.5 grams of glutathione, was added directly to the 90 ml. of filtrate obtained from the hydrogen sulfide gassing step without stripping the excess hydrogen sulfide with nitrogen. This solution was concentrated and labeled glutathione precipitated and recrystallized from aqueous ethanol yielding 6.1 grams of product with a specific activity of 0.105 $\mu c/mg$. The melting point was 181–183° C.

Chromatographic assay revealed the presence of less than 2% oxidized glutathione but no other peptides, amino acids or sulfur-bearing contaminants were detected.

FERMENTATION Y

In this run, $S^{35}$ having an activity of 62.5 mc., was used. The additional sulfur source was 25 mgs. $MgSO_4 \cdot 7H_2O$ added to the medium otherwise prepared according to the abovementioned Olson and Johnson method. The inoculum size was about 0.18 ml. and the incubation was carried out for nearly 24 hours. The harvest of $S^{35}$ yeast cells was 2.8–2.9 ml. after a single water washing. No spectrophotometric assay was run on the plasmolyzate of these cells. In precipitating the glutathione, 1 gram of carrier was used and the amount of copper reagent adjusted to this quantity of carrier. The precipitation of cuprous glutathione was made at 40° C. from a solution adjusted to pH 1.5. The cuprous glutathione was centrifuged off immediately and washed with an equal volume of water. After twelve hours standing, additional cuprous glutathione had appeared near the surface. The after-precipitate was combined with the main precipitate. After removal of the copper as the sulfide, 250 mgs. of Darco G 60 were added to the glutathione solution and kept in suspension by manual stirring for ten minutes. When an additional 2.6 grams of carrier glutathione was added to this filtrate, it was dissolved by bubbling nitrogen gas through the liquid, and this solution was desiccated in vacuo over calcium chloride and sodium hydroxide.

Crystals appeared in the concentrated glutathione solution to give a crystalline slush. After the addition of 6.0 ml. absolute ethanol and then 5.0 ml. 50% ethanol, the crystals were filtered off, washed with 75% alcohol, and then washed with absolute alcohol. This product weighed 2.77 grams, had an M. P. of 187–189° C., the glutathione had an activity of 0.9 $\mu c./mg.$ and chromatography showed a faint trace, probably less than 1%, of oxidized glutathione as the only visible ninhydrin positive contaminant.

The alcoholic glutathione filtrate was concentrated to a syrup and a solid product obtained by hardening with alcohol. Chromatography with different solvent systems and examination of the developed areas showed the approximate distribution to be 26% oxidized glutathione, 16% cysteinylglycine and 58% glutathione. This product weighed 0.610 gram and had a specific activity of 0.97 $\mu c./mg.$ The filtrates from the above crystallizations were further diluted with 0.5 gram cold glutathione and worked up by reprecipitation of the copper complex. Additional activity was recovered and the crystalline glutathione weighed 0.238 gram and had a specific activity of 0.62 $\mu c./mg.$, M. P. 187–189° C. This was also chromatographically pure.

FERMENTATION Z

In this run, a 0.18 ml. inoculum of *Torula utilis* was added to a medium prepared according to Olson and Johnson, as above described, in which the sulfur source was $S^{35}$ sulfate having a total activity of 48.0 mc. and 25 mgs. of $MgSO_4 \cdot 7H_2O$. The harvest of cells after 24 hours of incubation was 3.5 ml. The clarified medium was then treated with additional nutrients which included 1.0 gram glucose, 20 mgs. $KH_2PH_4$, 21 mgs. $MgCl_2 \cdot 6H_2O$ and 250 mgs. asparagine, brought to pH 5.0–5.1 with 1.0 M $NH_4OH$ and reinoculated with 0.19 ml. of "cold" Torula cells.

This suspension was then incubated as in previous runs, but after five hours the pH was readjusted to 4.8 from about 4.5 and incubation continued further up to about 24 hours. This second harvest of cells was 2.5 ml.

Each crop of Torula cells was plasmolyzed directly after recovery, and two sets of data collected up to and including the glutathione solutions, which were obtained upon filtration of the copper sulfide, and which were combined so that only a single product would be isolated. The following data show the advantage of a two step growing process that entails, as additional steps, a refortification of the medium with nutrients, particularly glucose, the overall incorporation of $S^{35}$ into the plasmolyzate being about twice that of previous runs:

micro scale in an $S^{35}$ sulfate medium having a high level of specific activity and adding unlabeled glutathione as

TABLE IV
*Details of $S^{35}$ distribution in fermentation Z*

| | First Crop of Torula U. | Second Crop of Torula U. | Overall Data |
|---|---|---|---|
| Initial Medium | $4.56 \times 10^{10}$ c. p. m.; 48 mc. | $2.34 \times 10^{10}$ c. p. m. | $4.56 \times 10^{10}$ c. p. m.; 48 mc. |
| Final Medium | $2.34 \times 10^{10}$ c. p. m.; Ini. Med: 51.3%. | $1.09 \times 10^{10}$ c. p. m.; 48.7%. | $1.09 \times 10^{10}$ c. p. m.; Init. Med: 23.9%. |
| Yeast cells | $2.40 \times 10^{10}$ c. p. m.; 52.6%; Recovery: 103.9%. | $1.11 \times 10^{10}$ c. p. m.; 47.4%; Recovery: 96.1%. | $3.51 \times 10^{10}$ c. p. m.; Init. Med: 76.9%; Recovery: 100.8%. |
| Yeast Cell Wash Liquid | $3.92 \times 10^{7}$ c. p. m. | $3.37 \times 10^{7}$ c. p. m. | $7.29 \times 10^{7}$ c. p. m. |
| NaOH Trap | | | $1.07 \times 10^{6}$ c. p. m. |
| Pb(OAc)$_2$ Trap | | | $2.24 \times 10^{5}$ c. p. m. |
| Plasmolyzate | $5.44 \times 10^{9}$ c. p. m.; Cell $S^{35}$: 22.7%; 5.72 mc. | $3.89 \times 10^{9}$ c. p. m.; 35.1%; 4.1 mc. | $9.33 \times 10^{9}$ c. p. m.; cell. $S^{35}$: 26.6%; med. $S^{35}$: 20.5%. |
| Yeast Residue, Solids | $1.86 \times 10^{10}$ c. p. m.; 77.3%; Recovery: 100%. | $0.78 \times 10^{10}$ c. p. m.; 70.2%; Recovery: 105.3%. | $2.64 \times 10^{10}$ c. p. m.; cell. $S^{35}$: 75.1%; Recovery cell $S^{35}$: 101.7%. |
| Yeast Residue, Wash Liquid | $4.20 \times 10^{8}$ c. p. m. | $2.52 \times 10^{8}$ c. p. m. | $6.72 \times 10^{8}$ c. p. m. |
| Copper glutathione; Mother Liquor+1st Wash | $3.04 \times 10^{9}$ c. p. m.; Plasm. $S^{35}$: 55.8%. | $2.12 \times 10^{9}$ c. p. m.; 54.5%. | $5.16 \times 10^{9}$ c. p. m.; 55.4% Plasm. $S^{35}$. |
| Copper glutathione; 2nd wash | $1.86 \times 10^{7}$ c. p. m.; 0.3%. | $1.74 \times 10^{7}$ c. p. m.; 0.4%. | $3.60 \times 10^{7}$ c. p. m.; 0.4%. |
| Copper glutathione; 3rd wash | $2.12 \times 10^{7}$ c. p. m.; 0.4%. | $1.40 \times 10^{7}$ c. p. m.; 0.4%. | $3.42 \times 10^{7}$ c. p. m.; 0.4%. |
| Copper glutathione; 4th wash | $0.62 \times 10^{7}$ c. p. m.; 0.1%. | $1.47 \times 10^{7}$ c. p. m.; 0.4%. | $2.09 \times 10^{7}$ c. p. m.; 0.2%. |
| Cu$_2$S Filtrate | $3.07 \times 10^{9}$ c. p. m.; Plasm. $S^{35}$: 56.5%. | $2.80 \times 10^{9}$ c. p. m.; Plasm. $S^{35}$: 71.9%. | $5.87 \times 10^{9}$ c. p. m.; Plasm. $S^{35}$: 63.0%; Recovery: 119.4%. |
| *SGL 5202 | | | $4.22 \times 10^{9}$ c. p. m.; Plasm. $S^{35}$: 45.3%; Cu$_2$S Filt. $S^{35}$: 71.9%. |
| GS*-S*G | | | $0.92 \times 10^{9}$ c. p. m.; Plasm. $S^{35}$: 9.9%; Cu$_2$S Filt. $S^{35}$: 15.7%. |
| GS*-S*G Mother Liquor | | | $0.76 \times 10^{9}$ c. p. m.; Plasm. $S^{35}$: 8.2%; Cu$_2$S Filt. $S^{35}$: 13.0%. |
| Recovery | | | Plasm. $S^{35}$: 63.4%*; Cu$_2$S Filt. $S^{35}$: 100.6%. |

*In previous experiments, spectrophotometric assays have shown that only about 80% of the plasmolyzate $S^{35}$ is glutathione incorporated $S^{35}$. Therefore, the recovery of $S^{35}$ glutathione from the plasmolyzate by copper precipitation is about 80%.

The cuprous glutathione was obtained, in each run, by adding 1.0 gram of carrier glutathione and each copper sulfide filtrate received 0.5 gram of carrier glutathione to obtain a product of the desired activity. The last portions of carriers were dissolved by bubbling nitrogen gas through the solutions and the combined solutions brought to dryness in vacuo over CaCl$_2$ and NaOH. The final product, which was recrystallized from 75% ethanol, weighed 2.06 grams, had a specific activity of 2.15 μc./mg. and was chromatographically pure although its melting point was 181–183° C.

From the glutathione mother liquor which had been brought to dryness, a partly oxidized, partly reduced fraction was obtained. This product weighed 0.407 gram and assayed 2.28 μc./mg.

It is apparent from the foregoing that fermentation Z, the semi-micro propagation and $S^{35}$ incorporation followed by dilution, gives the best results in the biosynthesis of labeled glutathione. The compound can be recovered in significant quantity, at high purity and high specific activity. Valuable labeled sulfur-bearing amino acids, including oxidized glutathione, cysteinyl-glycine, cystine, methionine and glutamyl cysteine in the disulfide form can be obtained as by-products of the biosynthesis.

Obviously many modifications and variations of the present invention are possible in the light of the above teachings. It is therefore to be understood that within the scope of the appended claims the invention may be practiced otherwise than as specifically described.

We claim:

1. The method of isolation of $S^{35}$ labeled glutathione from yeast cells grown in $S^{35}$ sulfate containing media comprising the steps of propagation of yeast on a semi- carrier for the highly radioactive $S^{35}$ glutathione synthesized.

2. The method of preparing $S^{35}$ labeled glutathione comprising the steps of propagating yeast cells on a synthetic medium containing $S^{35}$ sulfate, harvesting and washing such cells, plasmolyzing such cells, adding carrier glutathione, precipitating cuprous glutathione therefrom, precipitating copper sulfide from said cuprous glutathione, and adding additional carrier glutathione to the labeled glutathione derived to provide a product of desired specific activity.

3. The method of preparing $S^{35}$ labeled glutathione comprising the steps of propagating yeast cells on a semi-micro scale on a synthetic medium containing $S^{35}$ sulfate, harvesting said cells and washing said cells by centrifugation, plasmolyzing said cells with Pirie's solution, collecting the supernatant and a plurality of washes thereof by centrifugation, adding carrier glutathione, precipitating cuprous glutathione by addition of cuprous sulfite reagent, recovering the cuprous glutathione by centrifugation and wash, decomposing, precipitating and removing copper sulfide therefrom, and adding carrier glutathione to the labeled glutathione derived to provide a product of desired specific activity.

4. The method of preparing $S^{35}$ labeled glutathione comprising the steps of propagating yeast cells on a semi-micro scale on a synthetic medium containing $S^{35}$ sulfate, harvesting said cells and washing said cells by centrifugation, plasmolyzing said cells with Pirie's solution, collecting the supernatant and a plurality of washes thereof by centrifugation, adding carrier glutathione, precipitating cuprous glutathione by addition of cuprous sulfite reagent at approximately pH 1.5, recovering the cuprous glutathione by centrifugation and wash, suspending the washed cuprous glutathione in water and gas with hydrogen sulfide to decompose and precipitate copper sulfide, removing and washing the copper sulfide by filtration and combining the supernatant and wash, adding additional carrier glutathione to the labeled glutathione derived to provide a product of desired specific activity, stripping hydrogen sulfide from said product with a nitrogen stream, treating said product with carbon, concentrating said product in vacuo, and crystallizing said product.

References Cited in the file of this patent

UNITED STATES PATENTS 2,376,186  Rapkine _____ May 15, 1945

OTHER REFERENCES

Guilliermond, The Yeasts, 1920, John Wiley Sons, Inc., page 68.

Patt et al., Science, 110, 1949, pages 213, 214.